Jan. 10, 1928.

F. BARNEY 1,655,587

SAFETY DEVICE

Filed June 28, 1926

Inventor
Freeman Barney.
By Frank E. Liverance, Jr.
Attorney.

Patented Jan. 10, 1928.

1,655,587

UNITED STATES PATENT OFFICE.

FREEMAN BARNEY, OF GRAND HAVEN, MICHIGAN, ASSIGNOR TO THE CHALLENGE MACHINERY COMPANY, OF GRAND HAVEN, MICHIGAN, A CORPORATION OF MICHIGAN.

SAFETY DEVICE.

Application filed June 28, 1926. Serial No. 119,060.

This invention relates to a safety device adapted to be applied to a variety of machines which are driven from any suitable source of power, the machine having a power shaft subject to connection with or disconnection from a power element whereby the machine is driven when said shaft is thus connected and is stopped when the shaft is disconnected. One place where the invention which I have made has been utilized is in printing presses but it is evident that it may be used in many other relations and with other machines.

It is a primary object and purpose of the present invention to provide a safety device which will act automatically to hold the clutch parts in disconnected relation when they have been operated to such position, the reconnection or re-engagement of the clutch parts being impossible without the attention of the operator who must actuate certain parts before a reconnection of the clutch may be had. This will preclude any possibility of accidental starting the machine such as may occur should the operator accidentally lean against the clutch operating lever, the safety device of my invention being so constructed and acting in such manner that the clutch cannot be re-engaged accidentally but only by a predetermined operation of an operator.

To these ends I have devised the safety construction fully described in the following description and illustrated in the accompanying drawing, in which Fig. 1 is an end elevation of a printing press with my invention applied thereto and showing the safety device operating to hold the driving clutch disconnected.

Like reference characters refer to like parts in the different figures of the drawing.

The mechanism indicated as a whole at 1 is a certain type of printing press which, however, so far as this invention is concerned may be any machine, power driven. The machine has a drive shaft normally driven from a power wheel 2 which in operation is continually operated from any suitable source of power such, for instance, as a line shaft with a belt passing therefrom around the wheel 2. Associated with this wheel is a clutch indicated at 3 which may be moved into and out of engagement with the wheel so as to operate the machine when engaged and stop its operation when disengaged.

The connection and disconnection of the clutch is controlled by an operating lever 4 pivotally mounted on a projecting arm 5 either connected to or integral with the frame of the machine, and having a downwardly extending fork $4^a$ to engage with the clutch in a well known manner. When the lever is pulled outwardly at its upper end the clutch is disengaged and when moved inwardly the clutch is engaged.

Figure 4:
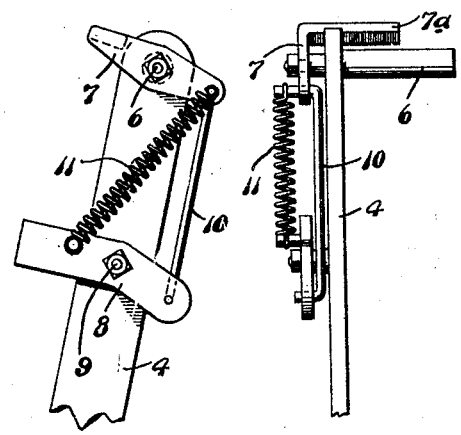
Fig. 4 is a fragmentary enlarged front elevation of the safety device which is applied to the clutch operating lever.

At the upper end of the clutch lever 4 a laterally extending rod 6 is secured to serve as a handle and at one end is reduced in size and has a lever 7 pivotally mounted thereon between its ends, one end of the lever being turned at right angles to make the extension $7^a$ which parallels the handle 6 and is adapted to be grasped by the hand at the same time that the handle 6 is manually engaged. A short distance below the lever 7 a stop bar 8 is pivotally mounted between its ends on the clutch lever 4 on the bolt or pin 9. The outer ends of the lever 7 and stop bar 8 are connected by a rod 10 which at its ends is bent at right angles to pass through the respective lever and bar. A coiled spring 11 is connected with the end of the rod 10 where it passes through the lever 7 and at its opposite end is connected with the stop bar 8 on the opposite side of the pivot 9 from where the rod 10 is attached, as fully shown in Fig. 4. This spring under tension normally has the effect of lifting the free end of the stop bar 8, turning the same about its pivot 9 and, of course, inducing a corresponding pivotal movement in the lever 7.

Figure 2:
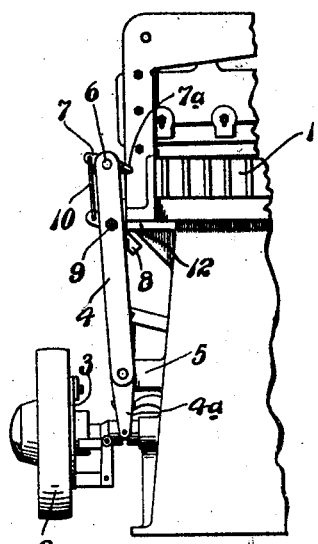
Fig. 2 is a fragmentary end elevation similar to Fig. 1 but showing only a part thereof, the driving clutch being in connected and operative position.
Figure 3:
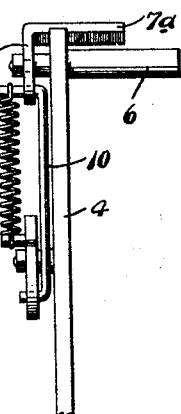
Fig. 3 is an end elevation of the construction shown in Fig. 4.

The frame of the machine in the embodiment of the invention shown includes a projecting bracket 12 so located with respect to the stop bar 8 that when the clutch is engaged, as shown in Fig. 2, the free end of the stop bar is located underneath said bracket and held in the downwardly and inwardly inclined position shown in Fig. 2.

Figure 1:
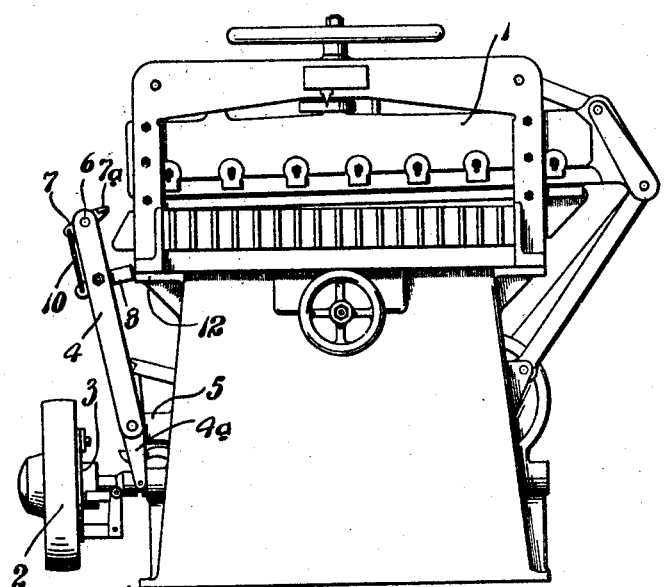

The spring 11 will be stretched but the usual clutch spring with which clutches are equipped is strong enough to overcome and stretch the spring 11. When the clutch at 3 is disengaged by pulling the clutch lever 4 outward to the position shown in Fig. 1 as soon as the free end of the stop bar 8 passes by the end of the bracket 12 it turns upwardly to the position shown in Fig. 1 and when the lever 4 is released and tends to move back under the force of the clutch spring the free end of the top bar 8 abutts against the outer end of the bracket 12. The clutch is thus locked to all intents and purposes against re-engagement and cannot reconnect until the operator grasps the handle 6 and operates the part 7$^a$ of lever 7 so as to bring the free end of the stop bar 8 to a lower position where it will pass underneath the bracket 12.

From the foregoing it will be clear that as soon as the clutch operating lever 4 is pulled outwardly to a position where the free end of the stop bar 8 is drawn from underneath the bracket 12 the stop bar immediately moves upwardly to its operative position and the operator has to do nothing except pull out the lever 4 and release it, the stop acting automatically. This insures that the machine will not be accidentally started in motion. The device is of simple construction but is thoroughly practical and efficient and has so proved in actual use. The invention is defined in the appended claim and is to be considered comprehensive of all forms of structure coming within their scope.

I claim:

In combination with a clutch, a pivotally mounted clutch operating lever connected with the clutch, a stop bar pivotally mounted between its ends on said lever a distance below the upper end thereof, a second bar pivotally mounted between its ends near the upper end of the lever, means for manually turning said second bar, a rod connecting one end of the stop bar with said second bar, and a coiled spring under tension connecting the same end of the second bar with the stop bar, said spring being connected with the stop bar at the side opposite the pivot from where the rod is connected thereto.

In testimony whereof I affix my signature.

FREEMAN BARNEY.